US008780973B2

(12) United States Patent
Srinivasamurthy et al.

(10) Patent No.: US 8,780,973 B2
(45) Date of Patent: Jul. 15, 2014

(54) LIMITING THE MAXIMUM SIZE OF AN ENCODED VIDEO PICTURE USING SUB-PICTURE BASED RATE CONTROL

(75) Inventors: Naveen Srinivasamurthy, Bangalore (IN); Girish Srinivasa Murthy, Bangalore (IN); Satish Kumar, Bangalore (IN); Soyeb Nagori, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 295 days.

(21) Appl. No.: 13/206,718

(22) Filed: Aug. 10, 2011

(65) Prior Publication Data

US 2012/0039386 A1    Feb. 16, 2012

Related U.S. Application Data

(60) Provisional application No. 61/373,607, filed on Aug. 13, 2010.

(51) Int. Cl.
*H04N 7/50* (2006.01)
*H04N 7/26* (2006.01)

(52) U.S. Cl.
CPC ... *H04N 19/00096* (2013.01); *H04N 19/00278* (2013.01); *H04N 19/00187* (2013.01); *H04N 19/0006* (2013.01)
USPC ......................................................... 375/240

(58) Field of Classification Search
CPC .............. H04N 7/50; H04N 19/00733; H04N 19/00684; H04N 19/00715; H04N 19/00781
USPC ................................................. 375/340, 240
See application file for complete search history.

(56) References Cited

U.S. PATENT DOCUMENTS 6,795,503 B2 *    9/2004    Nakao et al. ............. 375/240.16

OTHER PUBLICATIONS

"TMS320DM6467 Digital Media System-on-Chip", SPRS403G, Texas Instruments Incorporated, Dec. 2007, Revised Oct. 2010, pp. 1-355.
"Extended Video Procedures and Control Signals for H.300-Series Terminals", ITU-T Recommendation H.241, Series H: Audiovisual and Multimedia Systems, Infrastructure of Audiovisual Services—Communication Procedures, ITU-T Telecommunication Standardization Sector of ITU, May 2006, pp. 1-40.
Siwei MA et al, "Rate-Distortion Analysis for H.264/AVC Video Coding and its Application to Rate Control", IEEE Transactions on Circuits and Systems for Video Technology, vol. 15, No. 12, Dec. 2005, pp. 1533-1544.
Thomas Wiegand et al, "Overview of the H.264/AVC Video Coding Standard", IEEE Transactions on Circuits and Systems for Video Technology, vol. 13, No. 7, Jul. 2003, pp. 560-576.

* cited by examiner

*Primary Examiner* — Dave Czekaj
*Assistant Examiner* — Berteau Joisil
(74) *Attorney, Agent, or Firm* — Mirna Abyad; Frederick J. Telecky, Jr.

(57) ABSTRACT

A method for encoding a picture in a video sequence is provided that includes determining the current encoded size of the picture after coding a plurality of macroblocks in the picture, determining that encoding remaining macroblocks in the picture may cause the encoded size of the picture to exceed a maximum encoded picture size, computing a quantization scale responsive to the determining, wherein the quantization scale is computed such that the estimated encoded size of the remaining macroblocks if the remaining macroblocks are quantized with the quantization scale does not exceed the difference between the maximum encoded picture size and the current encoded picture size, and quantizing at least one of the remaining macroblocks with the new quantization scale.

16 Claims, 10 Drawing Sheets

| DMA (N) | IPE/ME (N-1) | DMA (N-2) | MC (N-3) | DMA (N-3) | TQ (N-4) | EC (N-5) | BS (N-6) | LPF (N-7) | DMA (N-8) |
*FIG. 1*
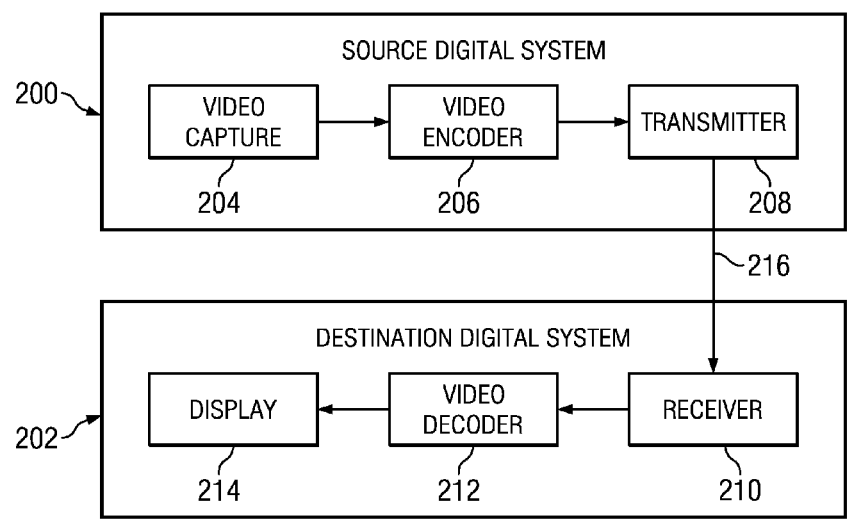
*FIG. 2*
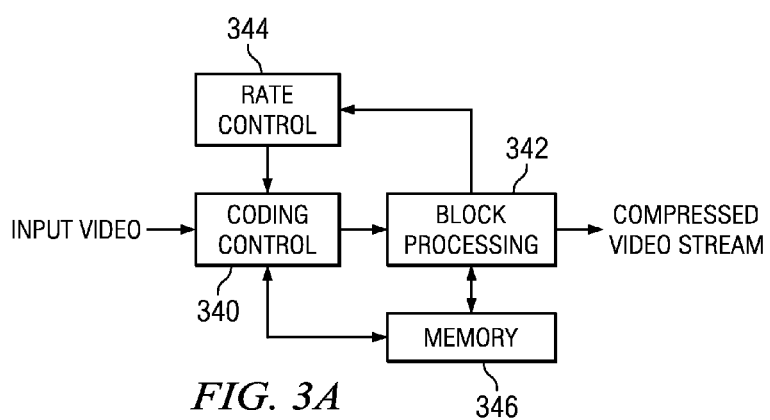
*FIG. 3A*

LIMITING THE MAXIMUM SIZE OF AN ENCODED VIDEO PICTURE USING SUB-PICTURE BASED RATE CONTROL

CROSS-REFERENCE TO RELATED APPLICATIONS

This application claims benefit of U.S. Provisional Patent Application Ser. No. 61/373,607, filed Aug. 13, 2010, which is incorporated by reference herein in its entirety.

BACKGROUND OF THE INVENTION

1. Field of the Invention

Embodiments of the present invention generally relate to limiting the maximum size of an encoded picture in an encoded video bit stream using sub-picture based rate control.

2. Description of the Related Art

In some video applications, it is important to ensure that the maximum encoded size of a picture is less than a specified maximum limit. As used herein, the term picture refers to a frame (for progressive video) or a field of a frame (for interlaced video) and the term frame refers to a complete image captured during a known time interval. For example, in video conferencing, the glass to glass delay, i.e., the end-to-end delay, is strongly influenced by the encoded picture size. If the encoded picture size is very large, the transmission time for such a picture (assuming a constant bit rate channel) will also be very large. The long transmission time will in turn cause the decoder receiving the encoded picture to incur a large buffering delay, which is undesirable from a real-time interaction perspective. In another example, in interactive gaming, the end-to-end delay is also strongly influenced by the encoded picture size, e.g., the delay should be less than 100 ms to provide for real-time interaction with a video game.

Another scenario in which control over the picture size is desirable is when H.241 is used during video encoding. H.241 refers to the ITU-T Recommendation H.241, entitled "Extended Video Procedures and Control Signals for H.300 Series Terminals", which establishes the communication procedures for the use of advanced video codecs, including H.264, with H.300 series terminals such as the communication terminals of ITU-T Recs. H.310, H.320, H.321, H.322, H.323 and H.324. These communication procedures include control, indication, capability exchange and transport mechanisms. H.241 also specifies that the maximum size of Network Access Layer (NAL) units generated by a video codec is constrained by the size of the maximum transmission unit (MTU) of an IP-network. That is, to avoid IP-layer packet fragmentation, H.241 states that NAL units should be strictly shorter than the MTU size of the network. For example, on an Ethernet network with a 1472 byte MTU, H.241 recommends a maximum size of 1200 bytes for a NAL Unit to allow for addition of a header without exceeding the MTU size of the network.

To reduce error due to packet losses in video streaming over an IP-network, the NAL units may be generated such that each NAL unit contains an independently decodable piece of video data, i.e., a slice of a picture in a video stream. That is, in H.264 and other coding standards, a picture may be segmented into sequences of macroblocks referred to as slices that are separately encoded. When the size of an encoded picture is large, the number of NAL units (or slices) may also be large due to the MTU size constraint. This increases the encoding time for the picture as additional overhead is incurred for slice header generation each time a new slice is started.

Further, it is the responsibility of the video encoder to enforce the MTU size constraint. Typically, the decision to end a slice and begin a new one due to the MTU size constraint is made in the entropy coding stage of the video encoder. If the video encoder has a pipelined architecture in which multiple macroblocks are processed concurrently in different coding stages, the macroblocks in the pipeline are assumed to be in the same slice and may have data/encoding dependencies. When the decision is made to start a new slice at entropy coding, at least some of the macroblocks in the pipeline may need to be re-encoded, thus increasing the encoding time for the picture.

Such increases in encoding time may result in the video encoder not being able to achieve real-time encoding, i.e., the encoder may take more time to encode a picture than the time between capture of two successive pictures. Thus, the encoder may start dropping pictures in order to meet the real-time coding requirement, thus reducing the quality of the encoded video.

SUMMARY

Embodiments of the present invention relate to a method, an apparatus, and a computer readable medium that limit the maximum size of an encoded video picture using sub-picture based rate control. The rate control includes determining the current encoded size of a picture after coding a plurality of macroblocks in the picture, determining that encoding remaining macroblocks in the picture may cause the encoded size of the picture to exceed a maximum encoded picture size, computing a quantization scale responsive to the determining, wherein the quantization scale is computed such that the estimated encoded size of the remaining macroblocks if the remaining macroblocks are quantized with the quantization scale does not exceed the difference between the maximum encoded picture size and the current encoded picture size, and quantizing at least one of the remaining macroblocks with the new quantization scale.

BRIEF DESCRIPTION OF THE DRAWINGS

Particular embodiments will now be described, by way of example only, and with reference to the accompanying drawings:

FIG. 1 shows an example of a video encoding pipeline;
FIG. 2 shows a block diagram of a digital system;
FIGS. 3A and 3B show block diagrams of a video encoder.

DETAILED DESCRIPTION OF EMBODIMENTS OF THE INVENTION

Figure 3B:
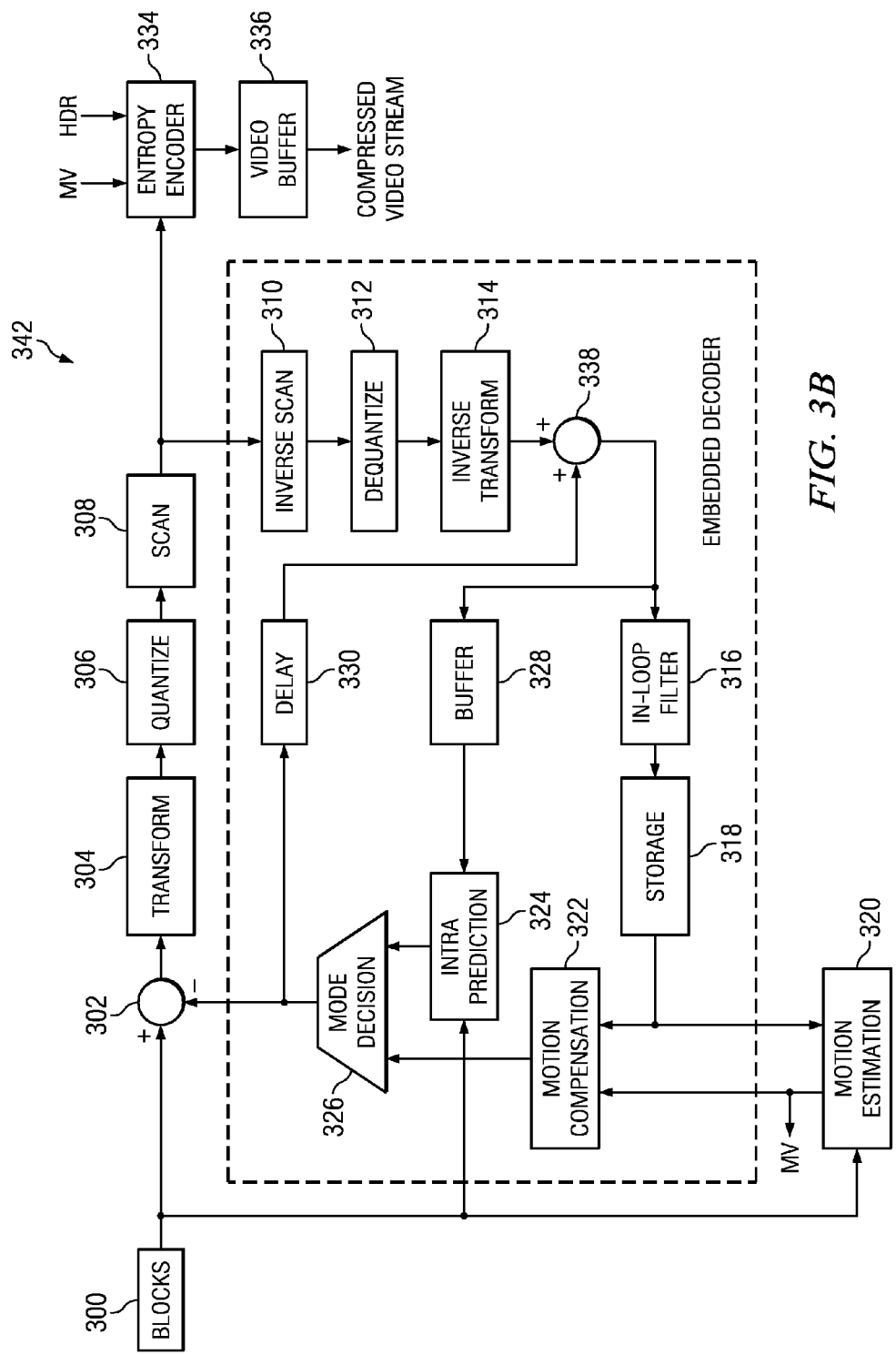

Specific embodiments of the invention will now be described in detail with reference to the accompanying figures. Like elements in the various figures are denoted by like reference numerals for consistency.

As was previously mentioned, H.241 defines the procedures for use of video codecs like H.264 with H.300 series terminals. Of particular interest for video encoder design are the H.241 MTU packetization constraints which specify a maximum size for H.264 NAL units. In order to comply with the MTU maximum size requirement, a video encoder may divide a picture into multiple slices, each of which is transmitted as a separate NAL unit. Further, it is desirable for the video encoder to ensure that the encoded slice size is as close to the maximum size as possible because filler data is typically added to make each NAL unit equal to the maximum NAL unit size before transmission. This addition of filler data reduces compression efficiency. Hence, from a video quality perspective, it is desirable to encode as many macroblocks as possible in a slice.

In general, when encoding of a macroblock will exceed the maximum size requirement, a new slice/NAL is started with the violating macroblock as the first macroblock of the new slice. As the encoded size of a macroblock is not known until completion of entropy coding, the information needed to determine a size violation is not available until after completion of entropy coding (EC). This can lead to increased processing overhead in many video encoders as the various stages involved in video encoding, e.g., motion estimation, motion compensation, mode decision, transformation, quantization, and entropy coding, are performed in a pipeline fashion. That is, at any point in time, one or more macroblocks are being processed concurrently at each stage.

For example, in many embedded systems supporting video processing, there may be one master processor and one or more slave processing modules, e.g., hardware accelerators. The master processor runs the main control loop for video encoding and the slave processing modules are employed to off load certain compute-intensive tasks of video encoding such as motion estimation (ME), motion compensation (MC), intra prediction mode estimation (IPE), transformation and quantization (TQ), entropy coding (EC), loop filter (LPF) and boundary strength (BS). The slave processing modules are controlled in a pipeline fashion by the master processor such that the slave processing modules operate on different macroblocks of a picture at any given time. That is, the slave processing modules are executed in parallel, each processing its respective macroblock while data movement from one processor to another is serial.

FIG. 1 shows an example of pipeline processing for video encoding. As can be seen from this example, each of the slave processing modules and the DMA (Direct Memory Access) module are operating on different macroblocks. For example, motion estimation (ME) and intra prediction mode estimation (IPE) are operating on macroblock N-1 while motion compensation (MC) is operating on macroblock N-3 and so on. Once all the modules complete the processing of their respective macroblocks, each macroblock is moved to the next module. That is, IPE/ME will operate on macroblock N, MC will operate on macroblock N-2, etc.

In such a pipelined video encoder, when a violation of the maximum size limit is identified after entropy coding (EC), there will be other macroblocks in the processing pipeline at various stages. When a new slice is started, the current processing of at least some of the macroblocks in the pipeline may not longer be appropriate for the new slice. For example, in FIG. 1, assume the maximum size violation is determined when macroblock N-5 is encoded by EC. The previous slice will be ended and macroblock N-5 will become the first macroblock of a new slice. Both macroblocks N-5 and N-4 need to be at least partially reprocessed in the pipeline to account for the creation of the new slice. That is, due to rate control changes and macroblock availability based on starting a new slice, TQ and EC need to be repeated for N-5 and TQ needs to be repeated for N-4. Further, an additional pipeline slot is needed for the DMA to bring in the necessary data to repeat the TQ processing of macroblock N-5. Thus, at each slice termination, three additional slots are introduced before the pipeline can again enter a steady state. In addition, when starting a new slice, the master processor incurs processing time to create the slice headers, to reprogram the DMA transfers parameters, slice-level re-initialization of the slave processing modules, etc.

Obviously, as the number of slices in a picture increases, the extra processing required for slice termination and pipeline rewind becomes a significant percentage of the total encoding time of a picture. In turn, the increased processing time may cause the video encoder to consume more time than is available to encode a picture, i.e., the video encoding time for a picture may exceed the time between capture of successive video pictures. If the video encoder is not able to achieve real-time performance, one or more captured video pictures will be dropped before encoding, leading to degraded video quality. Accordingly, it is desirable to control the number of slices in a picture in order to ensure that every picture will be encoded in real-time.

Embodiments of the invention provide rate control in video encoding that ensures that the maximum encoded size of a picture is strictly below a specified maximum limit, i.e., a maximum encoded picture size. The maximum encoded picture size is chosen such that the time to encode a picture of the maximum size will be less than the rate at which pictures are captured. As is described in more detail herein, in some embodiments, the maximum number of slices for an encoded picture $N_{max}$ is selected such that the encoding time for this maximum number of slices plus the overhead time due to the maximum number of slices is less than the picture rate. The maximum encoded picture size $B_{max}$ is then determined as $$B_{max} < N_{max} * H_{max}$$

where $H_{max}$ is the maximum size of a NAL unit as per H.241.

Rate control controls the picture size during encoding by periodically estimating the final encoded size of a picture as the macroblocks of the picture are encoded and determining a new, larger quantization scale to be used for remaining macroblocks when the estimated encoded picture size exceeds the maximum encoded picture size $B_{max}$. The new quantization scale is computed such that an estimated encoded size $B_{exp\_new}$ of the remaining macroblocks using the new quantization scale is less than or equal to the number of bits remaining before the maximum encoded picture size is reached. The remaining number of bits is the difference between the maximum encoded picture size $B_{max}$ and the actual encoded size $B_{enc}$ of the picture at that point in time. Accordingly, the new quantization scale is computed such that $B_{exp\_new} \leq B_{max} - B_{enc}$. Thus, in embodiments of the invention, the encoding time for all pictures is ensured to be less than the capture time between two successive pictures, thus guaranteeing real time encoding. Further, as is described in more detail herein, application of an embodiment of the rate control to test video sequences has been shown to improve the quality of the encoded video over rate control that does not limit the maximum encoded size of a picture.

FIG. 2 shows a block diagram of a digital system in accordance with one or more embodiments. The system includes a source digital system 200 that transmits encoded video sequences to a destination digital system 202 via a communication channel 216. The source digital system 200 includes a video capture component 204, a video encoder component 206 and a transmitter component 208. The video capture component 204 is configured to provide a video sequence to be encoded by the video encoder component 206. The video capture component 204 may be for example, a video camera, a video archive, or a video feed from a video content provider. In some embodiments, the video capture component 204 may generate computer graphics as the video sequence, or a combination of live video, archived video, and/or computer-generated video.

The video encoder component 206 receives a video sequence from the video capture component 204 and encodes it for transmission by the transmitter component 208. The video encoder component 206 receives the video sequence from the video capture component 204 as a sequence of pictures, divides the pictures into macroblocks and encodes the video data in the macroblocks. The video encoder component 206 may be configured to apply rate control during the encoding process as described herein. Embodiments of the video encoder component 206 are described in more detail below in reference to FIGS. 3A and 3B.

The transmitter component 208 transmits the encoded video data to the destination digital system 202 via the communication channel 216. The communication channel 216 may be any communication medium, or combination of communication media suitable for transmission of the encoded video sequence, such as, for example, wired or wireless communication media, a local area network, or a wide area network.

The destination digital system 202 includes a receiver component 210, a video decoder component 212 and a display component 214. The receiver component 210 receives the encoded video data from the source digital system 200 via the communication channel 216 and provides the encoded video data to the video decoder component 212 for decoding. The video decoder component 212 reverses the encoding process performed by the video encoder component 206 to reconstruct the macroblocks of the video sequence. The reconstructed video sequence is displayed on the display component 214. The display component 214 may be any suitable display device such as, for example, a plasma display, a liquid crystal display (LCD), a light emitting diode (LED) display, etc.

In some embodiments, the source digital system 200 may also include a receiver component and a video decoder component and/or the destination digital system 202 may include a transmitter component and a video encoder component for transmission of video sequences both directions for video streaming, video broadcasting, video conferencing, gaming, and video telephony. Further, the video encoder component 206 and the video decoder component 212 may perform encoding and decoding in accordance with one or more video compression standards. The video encoder component 206 and the video decoder component 212 may be implemented in any suitable combination of software, firmware, and hardware, such as, for example, one or more digital signal processors (DSPs), microprocessors, discrete logic, application specific integrated circuits (ASICs), field-programmable gate arrays (FPGAs), etc.

FIGS. 3A and 3B show block diagrams of a video encoder, e.g., the video encoder 206 of FIG. 2, configured to perform rate control that limits the size of an encoded picture to a maximum size that ensures real-time encoding behavior. FIG. 3A shows a high level block diagram of the video encoder and FIG. 3B shows a block diagram of the block processing component 342 of the video encoder.

As shown in FIG. 3A, a video encoder includes a coding control component 340, a block processing component 342, a rate control component 344, and a memory 346. The memory 346 may be internal memory, external memory, or a combination thereof. The memory 346 may be used, for example, to store information for communication between the various components of the video encoder.

An input digital video sequence is provided to the coding control component 340. The coding control component 340 sequences the various operations of the video encoder, i.e., the coding control component runs the main control loop for video encoding. For example, the coding control component 340 performs any processing on the input video sequence that is to be done at the picture level, such as determining the coding type (I, P, or B), i.e., prediction mode, of each picture based on the coding structure, e.g., IPPP, IBBP, hierarchical-B, being used. The coding control component 340 also divides each picture into macroblocks for further processing by the block processing component 342. In addition, the coding control component 340 controls the processing of the macroblocks by the block processing component 342 in a pipeline fashion.

As is explained in more detail below, the coding control component 340 receives information from the block processing component 342 as macroblocks are processed and from the rate control component 344, and uses this information to control the operation of various components in the video encoder. For example, the coding control component 340 provides information regarding quantization scales determined by the rate control component 344 to various components of the block processing component 342 as needed.

In another example, when H.241 is used, the coding control component 340 controls when a new slice is started by the block processing component 342. That is, the coding control component 340 monitors the size of the current slice to ensure that the slice size does exceed a maximum NAL size as mandated by H.241. The coding control component 340 may use any suitable technique for ensuring that the slice size does not exceed the maximum NAL size. For example, the coding control component 340 may operate as follows. The coding control component 340 monitors the slice size by accumulating the encoded size of each macroblock in the slice after processing by the entropy encoder 334. After the entropy encoder 334 codes a macroblock but before the entropy coded macroblock is released for inclusion in the current slice, the coding control component 340 compares the current slice size with the addition of the entropy coded macroblock with the maximum NAL size. If the comparison result indicates that the maximum NAL size will be exceeded, the coding control component 340 causes the block processing component 342 to end the current slice and start a new slice with the macroblock, rewinding the encoding pipeline as needed to process the macroblocks in the pipeline as needed for the new slice. Otherwise, the coding control component 340 allows the addition of the entropy coded macroblock to the current slice.

The coding control component 340 also determines the maximum encoded size of a picture that is to be enforced by the rate control component 344. The maximum encoded picture size $B_{max}$ may be determined as given by Eq. 6 below as per the following derivation.

The total number of encoding cycles per picture, C, is given by $$C = M*T + (S + P*T)*N \qquad (1)$$

where M is the number of macroblocks in the picture, T is the number of processing cycles for a macroblock, i.e., the pipeline depth, S is the number of slice re-initialization cycles, P is the number of macroblocks to be re-encoded due to slice termination, and N is the number of slices in the picture. In the above equation, M*T is the number of cycles required for normal picture encoding and (S+P*T)*N is the number of extra encoding cycles in the video encoder due to use of slices. As used herein, a cycle refers to one clock tick of the master clock controlling the pipeline.

Assume that the underlying processor(s) on which the video encoder is executed operates at F MHz and that the picture level processing consumes $F_{picture}$ MHz. Then, the MHz left for slice and macroblock level processing is $F_{slice\_mb}=(F-F_{picture})$ MHz. Also assume that the video sequence is captured at the rate of r pictures-per-second. Thus, the available MHz per picture for slice and macroblock level processing is $f_{slice\_mb}=F_{slice\_mb}/r$. To ensure real-time encoding, the total number of encoding cycles for slice and macroblock processing per picture, C, should satisfy the following constraint:

$$C \leq F_{slice\_mb}. \quad (2)$$

From this constraint, the maximum number of slices, $N_{max}$, can be derived as follows $$M*T+(S+P*T)*N \leq fslice\_mb \quad (3)$$

$$N \leq \frac{f_{slice\_mb}-M*T}{(S+P*T)} \quad (4)$$

$$N_{max}=\left\lfloor\frac{f_{slice\_mb}-M*T}{(S+P*T)}\right\rfloor. \quad (5)$$

The maximum encoded picture size can thus be computed as $$B_{max}=\alpha*N_{max}*H_{max} \quad (6)$$

where $\alpha(<1)$ is an experimentally derived factor to account for filler data and $H_{max}$ is the maximum slice size (in bits), i.e., maximum NAL unit size, as per the applicable H.241 maximum MTU constraint.

Note that the value of $B_{max}$ can be determined dynamically based on the picture rate, the picture size, and the macroblock size. For example, let F=600 MHz, F_picture=30 MHz, and r=30 fps. The value of F_picture may be determined by profiling the video encoder and determining the MHz required for picture based processing. Then, $f_{slice\_mb}=(F-F\_picture)/r=(600-30)/30=19$ Mcycles. S, P, and T are constants based on the pipeline architecture, and M is a function of frame size and macroblock size. For example, for 1080p (1920×1080) with a 16×16 macroblock, M=8160. Using these values, $N_{max}$ can be computed as per Eq. 5, and $B_{max}$ can be computed as per Eq. 6.

The rate control component 344 determines a quantization scale QS for each macroblock in a picture based on various rate control criteria and provides the QS to the coding control component 340. The rate control component 344 may use any suitable rate control algorithm that determines QS values based on a budget of bits allocated to a picture. For example, the rate control algorithm may determine QS as globalAdj=(B_enc_pic−B_target)/(2*B_target)

QS_curr=(QS_base*(1+globalAdj))

where B_enc_pic is the number of bits consumed by the previous picture, B_target is the target number of bits for each picture, Qs_base is the average QS used to encode the previous picture, and QS_curr is the base QS to be used for the current picture. B_target=target_bitrate/r, where target_bitrate is the bit rate at which the video should be encoded.

The rate control component 344 checks periodically to determine if the encoding of the remaining macroblocks in the picture will cause the picture to exceed the maximum encoded picture size. The periodic check may be performed, for example, after each macroblock is entropy coded or after some number L of macroblocks have been encoded, where the value of L is determined experimentally and/or is user-specified. If the rate control component 344 determines that the maximum encoded picture size $B_{max}$ will be exceeded, the rate control component 344 computes a QS value to be used for encoding subsequent macroblocks to reduce the encoded size of the subsequent macroblocks. This new QS value remains in effect until another periodic check indicates a need to further increase the QS value or the encoding of the picture is completed. That is, the rate control algorithm normally used by the rate control component 344 is no longer used for the current picture.

More specifically, the rate control component 344 performs the periodic check according to Eq. 13 below and computes an increased QS according to Eq. 19 as per the following derivation. In this description, $MB_{tot}$ is the total number of macroblocks in a picture, $MB_{enc}$ is the number of macroblocks of the picture that have been encoded at the time the rate control component 344 performs the periodic check, $B_{enc}$ is the size of the encoded picture at the time the rate control component 344 performs the periodic check, and $QS_{avg}$ is the average quantization scale for the macroblocks in the picture that have been quantized at the time the rate control component 344 performs the periodic check.

The relationship between the average encoded bits per macroblock, b, and quantization scale QS can be expressed as $$b=k/QS \quad (7)$$

where k is a proportionality constant. Note that this formulation will also work when the average bits and quantization scale are assumed to be related based on quadratic or affine relations. Based on the number of macroblocks in a picture that has been encoded at a given point in time, the following relationship holds:

$$B_{enc}/MB_{enc}=k/Qs_{avg} \quad (8)$$

Note that $B_{enc}/MB_{enc}$ is the average encoded size of the currently encoded macroblocks.

Accordingly, the expected bit consumption $B_{exp}$, i.e., the estimated encoded size, for the remaining macroblocks in the picture if the average quantization scale $QS_{avg}$ is used is given by $$B_{exp}=k/QS_{avg}*(MB_{tot}-MB_{enc}). \quad (9)$$

Substituting for $k/QS_{avg}$ in Eq. 9 as given by Eq. 8, $$B_{exp}=B_{enc}/MB_{enc}*(MB_{tot}-MB_{enc}). \quad (10)$$

To enforce the $B_{max}$ constraint, the rate control component 344 should increase the quantization scale when $$B_{exp}>B_{max}-B_{enc}, \quad (11)$$

i.e., when the estimated encoded size of the picture, $B_{exp}+B_{enc}$, will exceed the maximum encoded picture size $B_{max}$. Substituting from Eq. 10, $$B_{enc}/MB_{enc}*(MB_{tot}-MB_{enc})>B_{max}-B_{enc}. \quad (10)$$

Eq. 12 may be rearranged as follows $$B_{enc}*(MB_{tot}-MB_{enc})>(B_{max}-B_{enc})*MB_{enc}. \quad (11)$$

Thus, when the condition of Eq. 13 is true, the maximum encoded picture size $B_{max}$ can be violated if the remaining macroblocks are encoded without increasing the QS.

More specifically, a new, larger quantization scale, $QS_{new}$, is computed for use in quantizing remaining macroblocks in picture to ensure that the estimated bit consumption for these macroblocks, $B_{exp\_new}$, complies with the following:

$$B_{exp\_new} \leq B_{max} - B_{enc} \quad (12)$$

where $$B_{exp\_new} = k/QS_{new} * (MB_{tot} - MB_{enc}). \quad (13)$$

Therefore, from Eqs. 14 and 15, $$k/QS_{new} * (MB_{tot} - MB_{enc}) \leq B_{max} - B_{enc}. \quad (14)$$

Eq. 16 may be rearranged as follows:

$$QS_{new} \geq k * \frac{(MB_{tot} - MB_{enc})}{(B_{max} - B_{enc})}. \quad (15)$$

Substituting for k from Eq. (8):

$$QS_{new} \geq QS_{avg} * \frac{B_{enc}}{MB_{enc}} * \frac{(MB_{tot} - MB_{enc})}{(B_{max} - B_{enc})}. \quad (18)$$

Accordingly, the new, increased quantization scale to be applied may be computed as $$QS_{new} = QS_{avg} * \frac{B_{enc}}{MB_{enc}} * \frac{(MB_{tot} - MB_{enc})}{(B_{max} - B_{enc})}. \quad (19)$$

Figure 4:
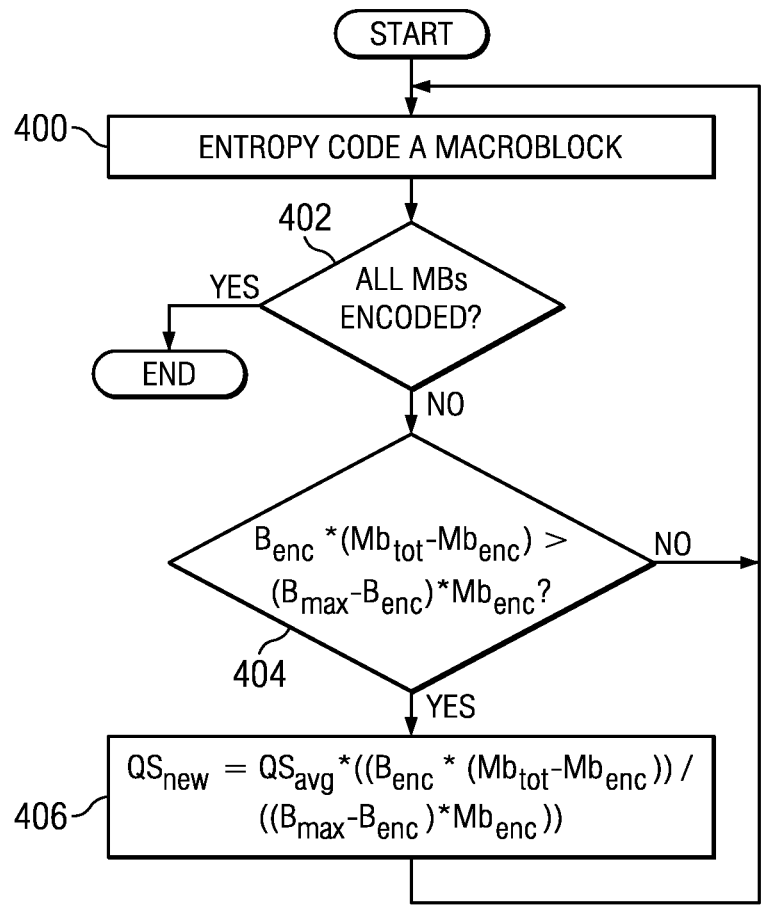
FIG. 4 shows a flow diagram of a method.

FIG. 4 is a flow diagram illustrating the above described rate control method for a picture. This diagram assumes that the check for exceeding $B_{max}$ is performed after each macroblock is entropy coded. One of ordinary skill in the art will understand other embodiments in which the check is performed after some number L of macroblocks is entropy coded.

As shown in FIG. 4, initially a macroblock in the picture is entropy coded 400. If all macroblocks are now coded 402, the method terminates for the picture. Otherwise, a check 404 is made to determine if encoding the remaining macroblocks in the picture will cause the encoded picture size to exceed the maximum encoded picture size $B_{max}$. This check is made according to Eq. 13 above. If this check shows that Bmax will not be exceeded 404, the process continues with the next macroblock 400. Otherwise, a new, increased quantization scale is computed as per Eq. 19 above 406, and the process continues with the next macroblock 400. This quantization scale is used in quantizing subsequent macroblocks until either the check 404 determines that quantization scale should be increased again or until all macroblocks in the picture are encoded.

Referring back to FIG. 3A, the block processing component 342 receives macroblocks from the coding control component 340 and encodes the macroblocks under the control of the coding control component 340 to generate the compressed video stream. FIG. 3B shows the basic coding architecture of the block processing component 342. One of ordinary skill in the art will understand that the components of this architecture may be mapped to pipelined slave processing modules in an embedded system as previously described herein. The macroblocks 300 from the coding control component 340 are provided as one input of a motion estimation component 320, as one input of an intra prediction component 324, and to a positive input of a combiner 302 (e.g., adder or subtractor or the like). Further, although not specifically shown, the prediction mode of each picture as selected by the coding control component 340 is provided to a mode decision component 326, and the entropy encoder 334.

The storage component 318 provides reference data to the motion estimation component 320 and to the motion compensation component 322. The reference data may include one or more previously encoded and decoded macroblocks, i.e., reconstructed macroblocks.

The motion estimation component 320 provides motion estimation information to the motion compensation component 322 and the entropy encoder 334. More specifically, the motion estimation component 320 performs tests on macroblocks based on multiple temporal prediction modes using reference data from storage 318 to choose the best motion vector(s)/prediction mode based on a coding cost. To perform the tests, the motion estimation component 320 may divide each macroblock into prediction units according to the unit sizes of prediction modes and calculate the coding costs for each prediction mode for each macroblock. The coding cost calculation may be based on the quantization scale for a macroblock as determined by the rate control component 344.

The motion estimation component 320 provides the selected motion vector (MV) or vectors and the selected prediction mode for each inter-predicted macroblock to the motion compensation component 322 and the selected motion vector (MV) to the entropy encoder 334. The motion compensation component 322 provides motion compensated inter-prediction information to the mode decision component 326 that includes motion compensated inter-predicted macroblocks and the selected temporal prediction modes for the inter-predicted macroblocks. The coding costs of the inter-predicted macroblocks are also provided to the mode decision component 326.

The intra-prediction component 324 provides intra-prediction information to the mode decision component 326 that includes intra-predicted macroblocks and the corresponding spatial prediction modes. That is, the intra prediction component 324 performs spatial prediction in which tests based on multiple spatial prediction modes are performed on macroblocks using previously encoded neighboring macroblocks of the picture from the buffer 328 to choose the best spatial prediction mode for generating an intra-predicted macroblock based on a coding cost. To perform the tests, the intra prediction component 324 may divide each macroblock into prediction units according to the unit sizes of the spatial prediction modes and calculate the coding costs for each prediction mode for each macroblock. The coding cost calculation may be based on the quantization scale for a macroblock as determined by the rate control component 344. Although not specifically shown, the spatial prediction mode of each intra predicted macroblock provided to the mode decision component 326 is also provided to the transform component 304. Further, the coding costs of the intra predicted macroblocks are also provided to the mode decision component 326.

The mode decision component 326 selects a prediction mode for each macroblock based on the coding costs for each prediction mode and the picture prediction mode. That is, the mode decision component 326 selects between the motion-compensated inter-predicted macroblocks from the motion compensation component 322 and the intra-predicted macroblocks from the intra prediction component 324 based on the coding costs and the picture prediction mode. The output of the mode decision component 326, i.e., the predicted macroblock, is provided to a negative input of the combiner 302 and to a delay component 330. The output of the delay component 330 is provided to another combiner (i.e., an adder)

338. The combiner 302 subtracts the predicted macroblock from the current macroblock to provide a residual macroblock to the transform component 304. The resulting residual macroblock is a set of pixel difference values that quantify differences between pixel values of the original macroblock and the predicted macroblock.

The transform component 304 performs unit transforms on the residual macroblocks to convert the residual pixel values to transform coefficients and provides the transform coefficients to a quantize component 306. The quantize component 306 quantizes the transform coefficients of the residual macroblocks based on quantization scales provided by the coding control component 340. For example, the quantize component 306 may divide the values of the transform coefficients by a quantization scale (Qs). In some embodiments, the quantize component 306 represents the coefficients by using a desired number of quantization steps, the number of steps used (or correspondingly the value of Qs) determining the number of bits used to represent the residuals. Other algorithms for quantization such as rate-distortion optimized quantization may also be used by the quantize component 306.

Because the DCT transform redistributes the energy of the residual signal into the frequency domain, the quantized transform coefficients are taken out of their scan ordering by a scan component 308 and arranged by significance, such as, for example, beginning with the more significant coefficients followed by the less significant. The ordered quantized transform coefficients for a macroblock provided via the scan component 308 along with header information for the macroblock and the quantization scale used are coded by the entropy encoder 334, which provides a compressed bit stream to a video buffer 336 for transmission or storage. The entropy coding performed by the entropy encoder 334 may be use any suitable entropy encoding technique, such as, for example, context adaptive variable length coding (CAVLC), context adaptive binary arithmetic coding (CABAC), run length coding, etc.

The entropy encoder 334 is also responsible for generating and adding slice header information to compressed bit stream when a new slice is started. Note that the coding control component 340 controls when the entropy coded bits of a macroblock are released into the compressed bit stream and also controls when a new slice is to be started. As previously described, the coding control component 304 monitors the slice size to ensure that a slice does not exceed a maximum NAL size. Accordingly, after a macroblock is entropy coded but before it is released into the compressed bit stream, the coding control component 340 determines whether or not including the current entropy-coded macroblock in the current slice will cause the slice to exceed the maximum NAL size. If the slice size will be too large, the coding control component 340 will cause the entropy encoder 334 to start a new slice with the current macroblock. Otherwise, the coding control component 340 will cause the bits of the entropy coded macroblock to be released into the compressed bit stream as part of the current slice.

Inside the block processing component 342 is an embedded decoder. As any compliant decoder is expected to reconstruct an image from a compressed bit stream, the embedded decoder provides the same utility to the video encoder. Knowledge of the reconstructed input allows the video encoder to transmit the appropriate residual energy to compose subsequent pictures. To determine the reconstructed input, i.e., reference data, the ordered quantized transform coefficients for a macroblock provided via the scan component 308 are returned to their original post-transform arrangement by an inverse scan component 310, the output of which is provided to a dequantize component 312, which outputs estimated transformed information, i.e., an estimated or reconstructed version of the transform result from the transform component 304. The dequantize component 312 performs inverse quantization on the quantized transform coefficients based on the quantization scale used by the quantize component 306. The estimated transformed information is provided to the inverse transform component 314, which outputs estimated residual information which represents a reconstructed version of a residual macroblock. The reconstructed residual macroblock is provided to the combiner 338.

The combiner 338 adds the delayed selected macroblock to the reconstructed residual macroblock to generate an unfiltered reconstructed macroblock, which becomes part of reconstructed picture information. The reconstructed picture information is provided via a buffer 328 to the intra-prediction component 324 and to a filter component 316. The filter component 316 is an in-loop filter which filters the reconstructed picture information and provides filtered reconstructed macroblocks, i.e., reference data, to the storage component 318.

The components of the video encoder of FIGS. 3A and 3B may be implemented in hardware, software, firmware, or any combination thereof. If implemented in software, the software may be executed in one or more processors, such as a microprocessor, application specific integrated circuit (ASIC), field programmable gate array (FPGA), or digital signal processor (DSP). The software instructions may be initially stored in a computer-readable medium such as compact disc (CD), a diskette, a tape, a file, memory, or any other computer readable storage device, and loaded and executed in the processor. In some cases, the software may also be sold in a computer program product, which includes the computer-readable medium and packaging materials for the computer-readable medium. In some cases, the software instructions may be distributed via removable computer readable media (e.g., floppy disk, optical disk, flash memory, USB key), via a transmission path from computer readable media on another digital system, etc.

Experimental results have shown that an embodiment of the above described rate control ensure that the maximum encoded picture size constraint is honored and additionally that the quality of the encoded video is improved over rate control in which a maximum encoded picture size constraint is not used. For the simulations, three test video sequences with scene changes were used as such sequences typically result in very large encoded picture sizes at scene changes which may lead to violation of real-time encoding. Such sequences may occur in video conferencing applications, for example, when video is shared during a video conference. Further, the maximum NAL unit size was set to 1400 bytes, which is a typical value used in video conferencing systems, the value of $\alpha$ (see Eq. 6) was set to 0.9, and the frame rate was 30 frames per second. FIG. 5A-5I show graphs of the results of the simulations for each of the three video sequences. In these graphs, constrained rate control represents the rate control embodiment in which the maximum encoded picture size is used and unconstrained rate control represents rate control without a maximum encoded picture size.

Figure 5A:
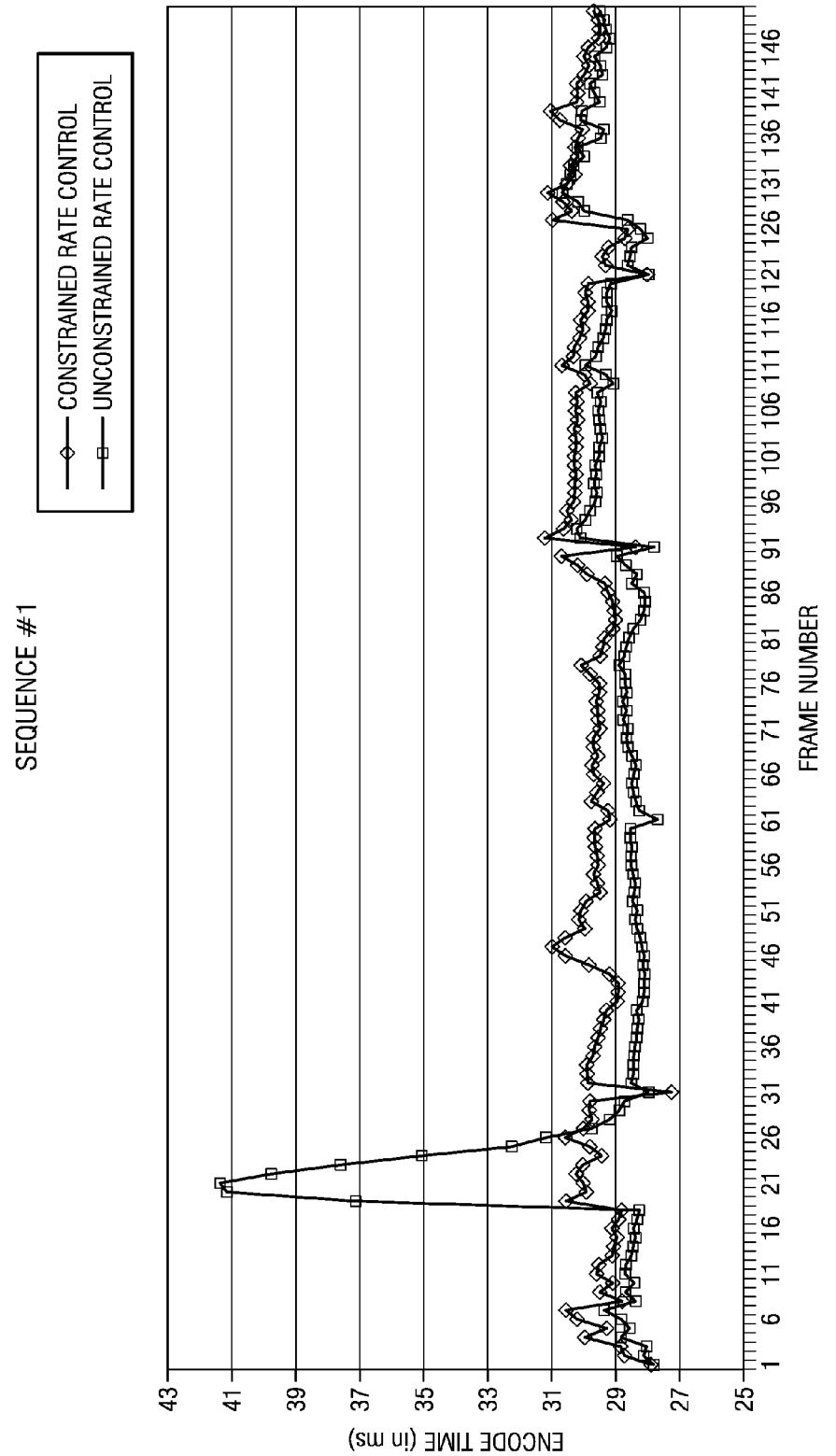
FIGS. 5A-5I show graphs of experimental results.
Figure 5B:
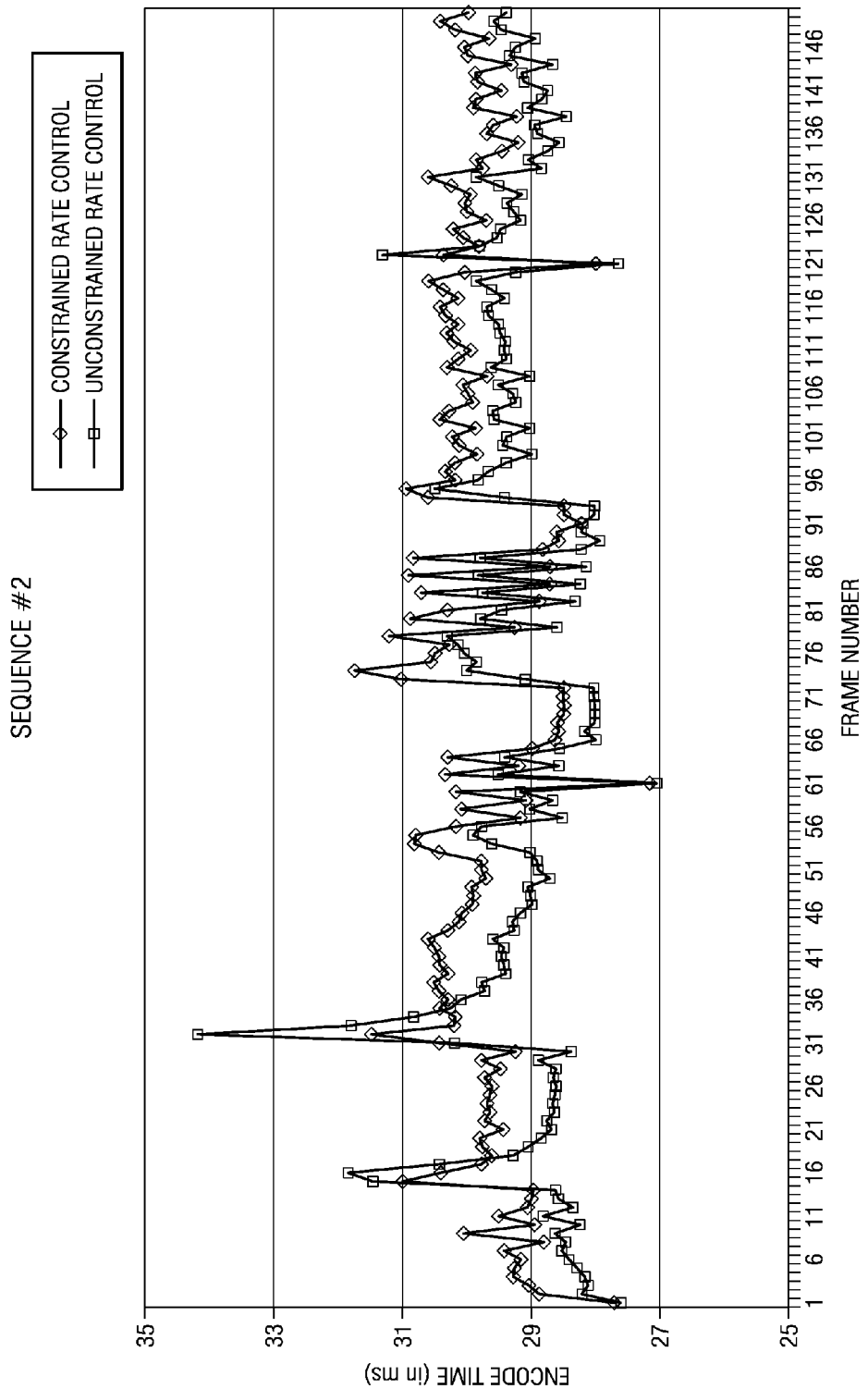
Figure 5C:
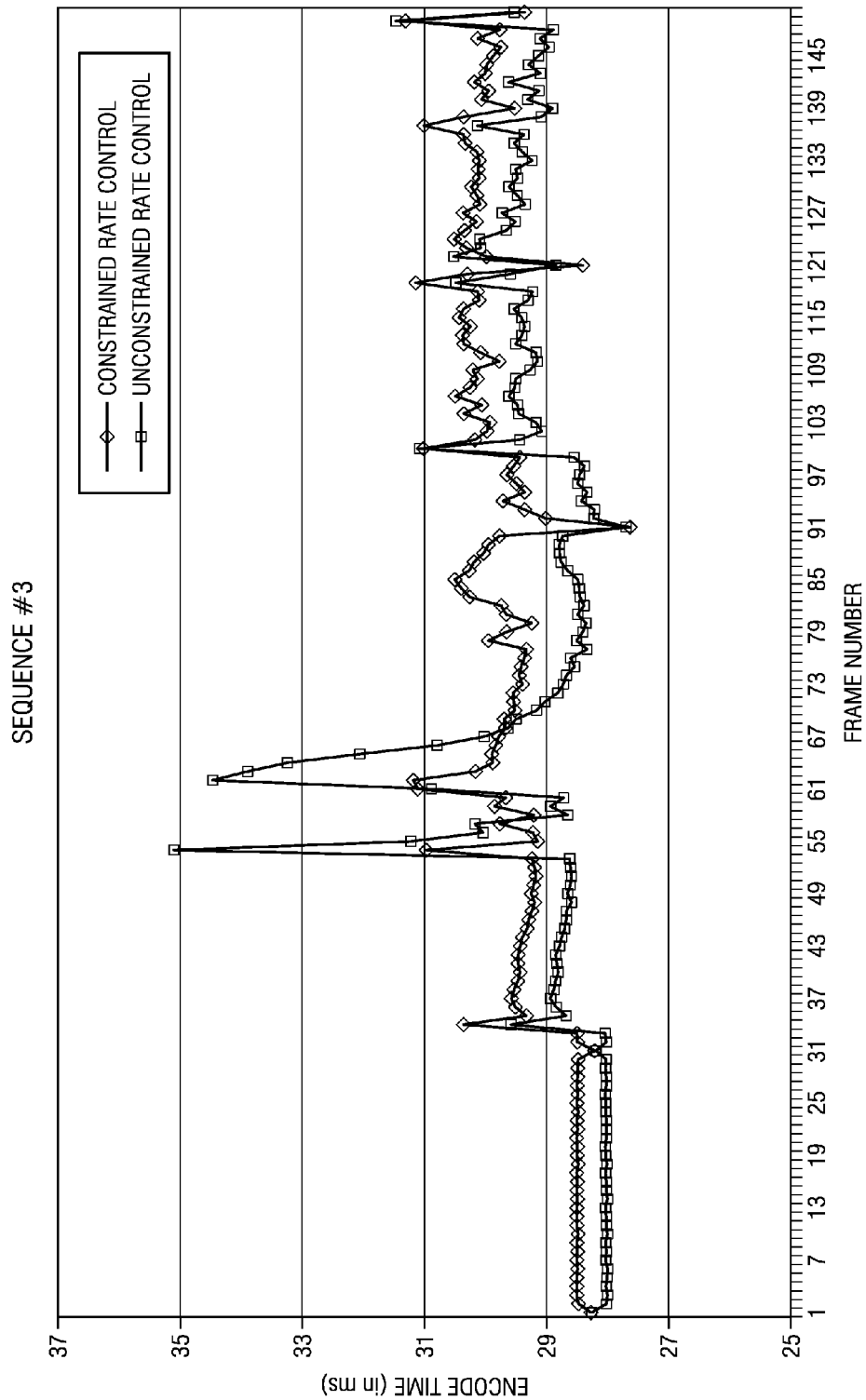

FIGS. 5A-5C show, respectively, the picture encoding times for each of the three sequences with and without the maximum encoded picture size constraint. As these graphs illustrate, when there is no limitation on the maximum encoded picture size, some picture encoding times violated the real-time encoding limit of 33.3 msec. However, when the maximum picture time constraint was used, the encoding time for every picture in all three sequences was less than 33.3 msec thus ensuring real-time encoding for all pictures. For example, as shown in FIG. 5A, peak encoding times greater than 41 msec were observed when encoding the first sequence without the maximum encoded picture size constraint. However, with the maximum encoded picture size constraint, encoding times for all pictures were always less than 33.3 msec. Similarly, as shown in FIG. 5C for the third sequence, four pictures exceeded the real time encoding constraint without the maximum encoded picture size constraint while all pictures had an encoding time less than 33.3 msec with the maximum encoded picture size constraint.

Figure 5D:
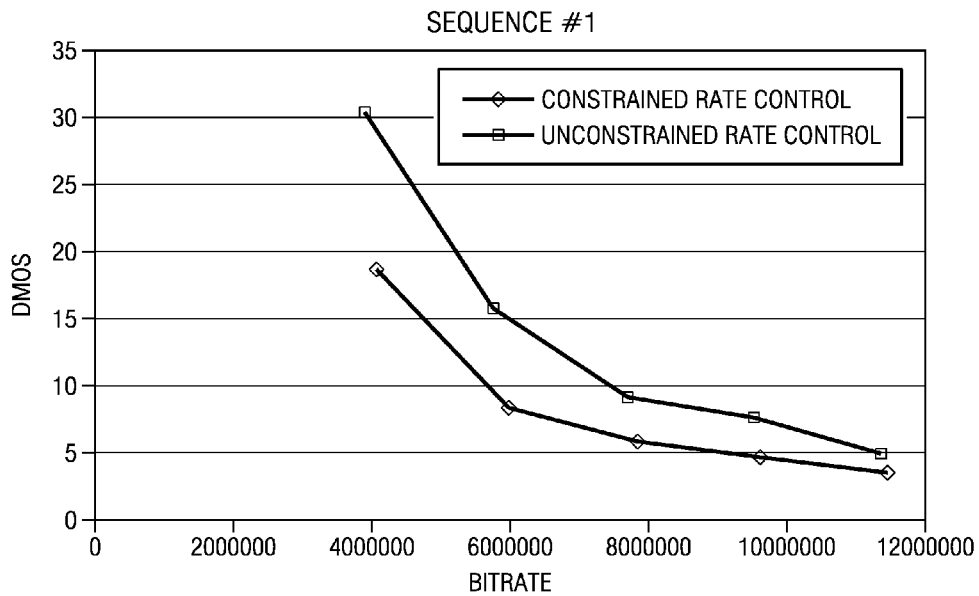
Figure 5E:
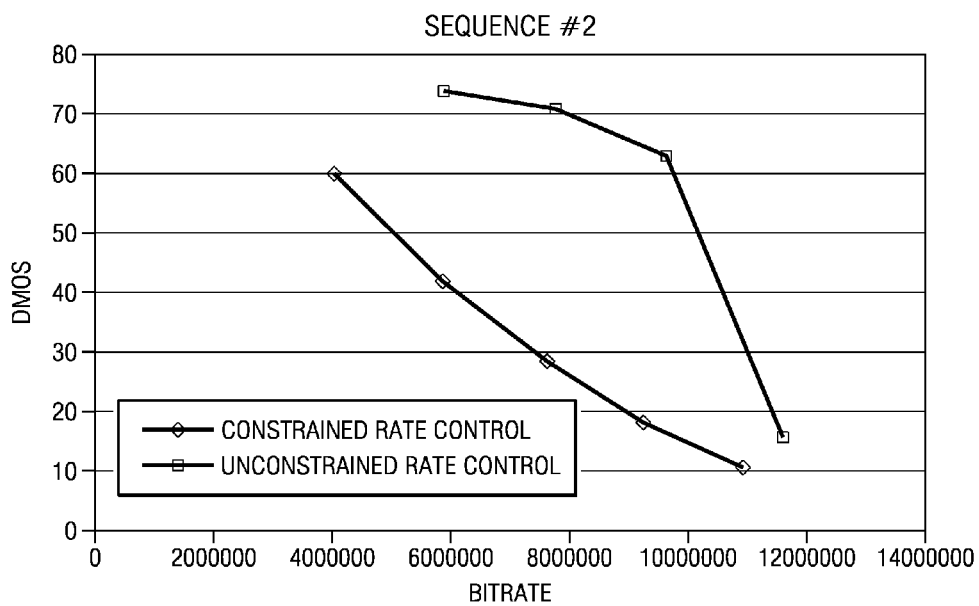
Figure 5F:
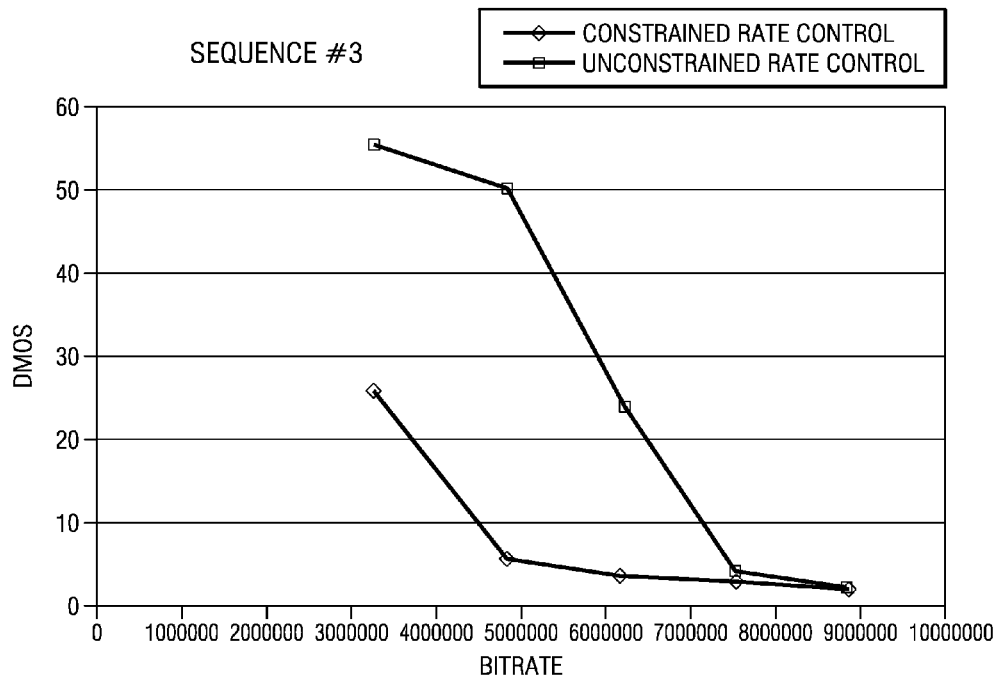
Figure 5G:
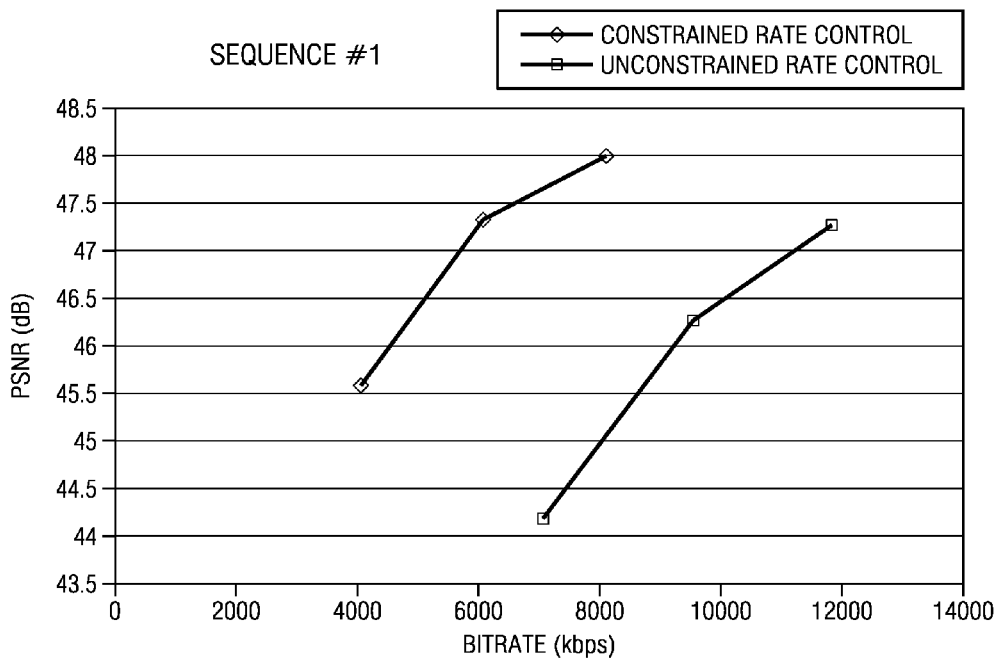
Figure 5H:
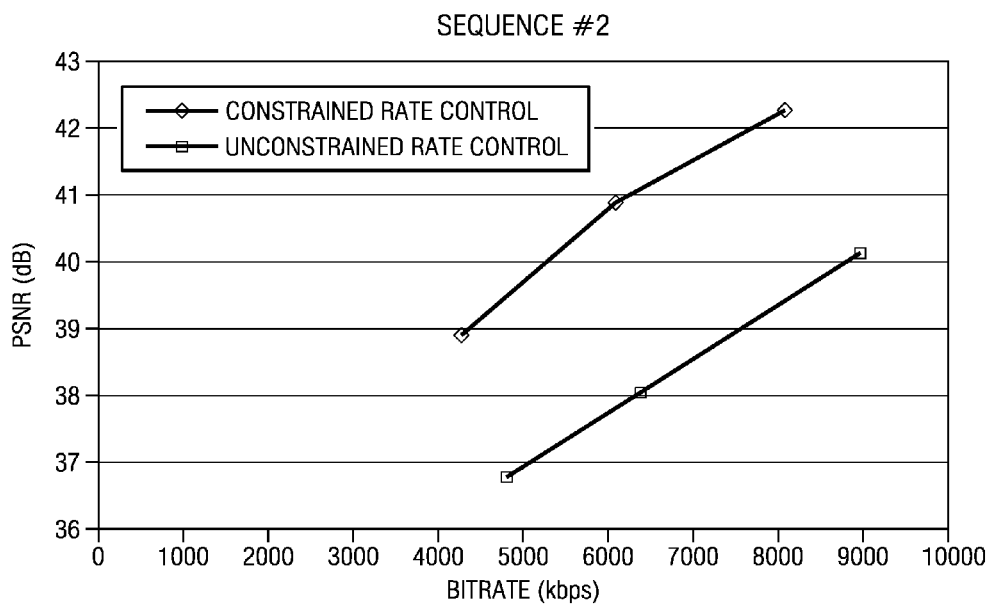
Figure 5I:
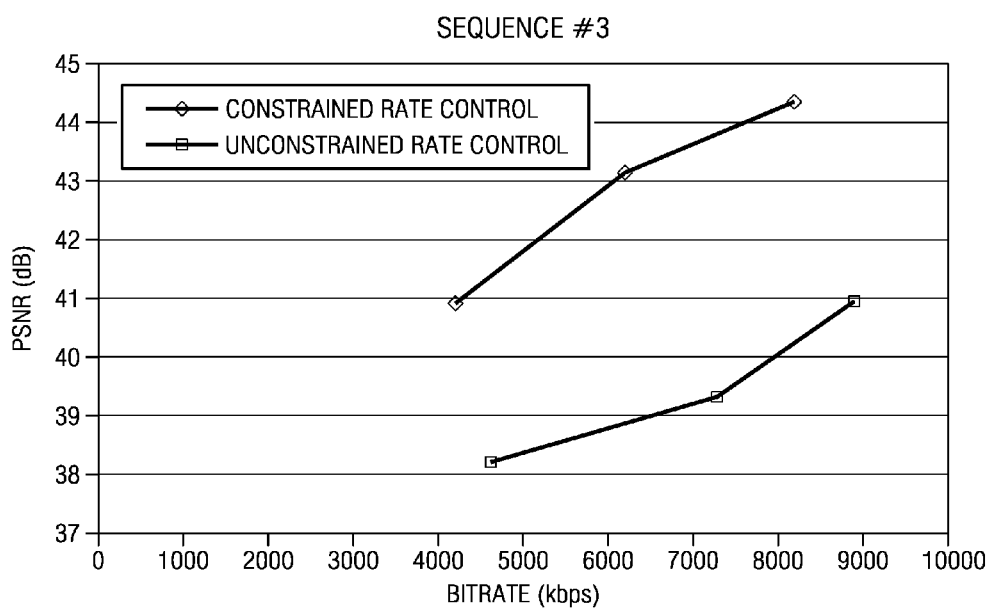

FIGS. 5D-5F show, respectively, the differential mean opinion score (DMOS) for each of the three sequences with and without the maximum encoded picture size constraint, and FIGS. 5G-5I, respectively, show the peak signal-to-noise ratio (PSNR) for each of the three sequences. When measuring video quality, increase in PSNR and reduction in DMOS indicates better quality. As these graphs show, using the maximum encoded picture size constraint provided significant video quality improvement over not using the maximum encoded picture size constraint. For example, as shown in FIG. 5I and FIG. 5F, respectively, the PSNR for the third sequence was increased by 3.8 dB and the differential mean opinion score (DMOS) was decreased by 44 points when the maximum encoded picture size constraint was used as compared to not using the maximum encoded picture size constraint.

Figure 6:
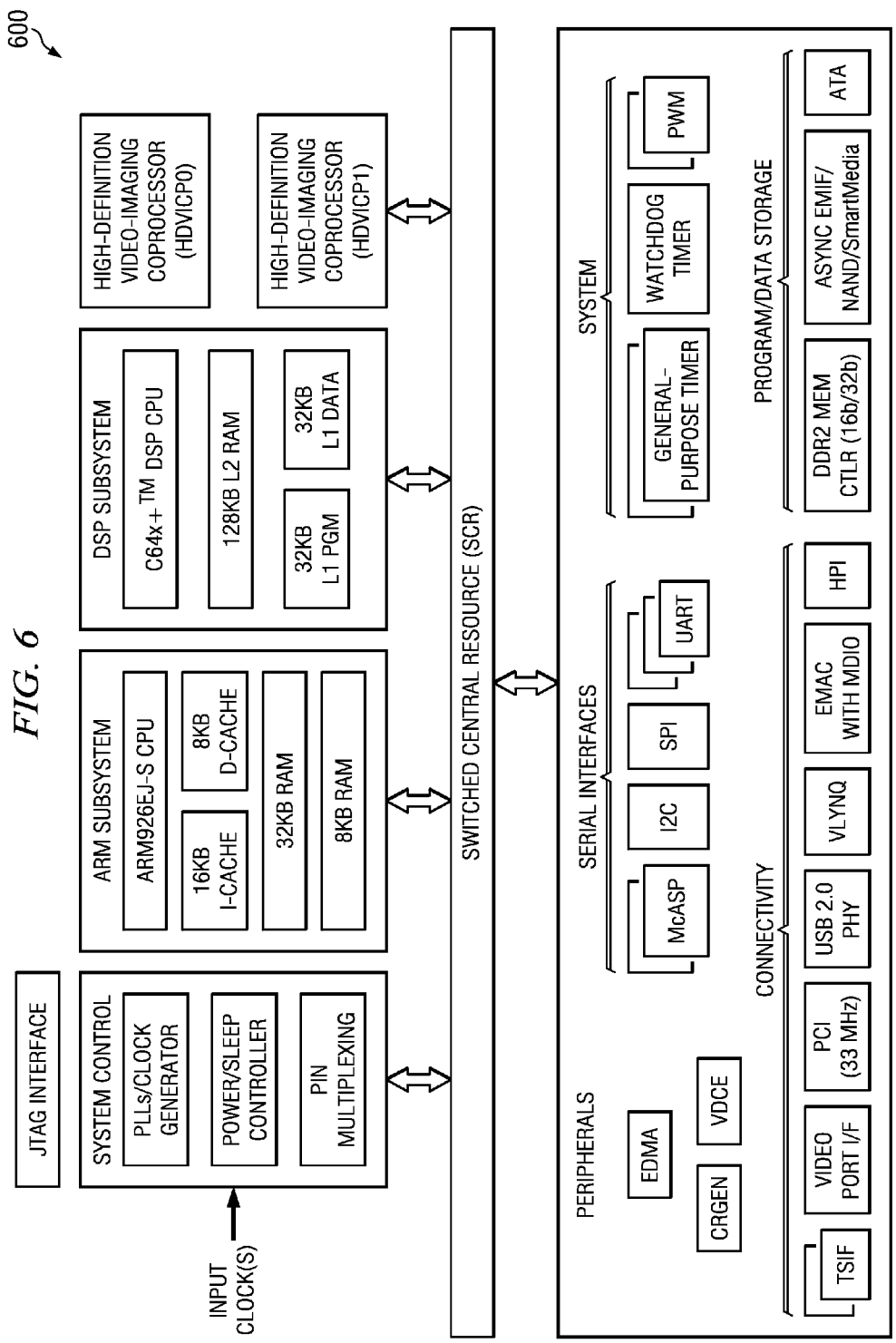
FIG. 6 shows a block diagram of an illustrative digital system.

FIG. 6 is a block diagram of an example digital system suitable for use as an embedded system that may be configured to perform rate control as described herein. This example system-on-a-chip (SoC) is representative of one of a family of DaVinci™ Digital Media Processors, available from Texas Instruments, Inc. This SoC is described in more detail in "TMS320DM6467 Digital Media System-on-Chip", SPRS403G, December 2007 or later, which is incorporated by reference herein.

The SoC 600 is a programmable platform designed to meet the processing needs of applications such as video encode/decode/transcode/transrate, video surveillance, video conferencing, set-top box, medical imaging, media server, gaming, digital signage, etc. The SoC 600 provides support for multiple operating systems, multiple user interfaces, and high processing performance through the flexibility of a fully integrated mixed processor solution. The device combines multiple processing cores with shared memory for programmable video and audio processing with a highly-integrated peripheral set on common integrated substrate.

The dual-core architecture of the SoC 600 provides benefits of both DSP and Reduced Instruction Set Computer (RISC) technologies, incorporating a DSP core and an ARM926EJ-S core. The ARM926EJ-S is a 32-bit RISC processor core that performs 32-bit or 16-bit instructions and processes 32-bit, 16-bit, or 8-bit data. The DSP core is a TMS320C64x+TM core with a very-long-instruction-word (VLIW) architecture. In general, the ARM is responsible for configuration and control of the SoC 600, including the DSP Subsystem, the video data conversion engine (VDCE), and a majority of the peripherals and external memories. The switched central resource (SCR) is an interconnect system that provides low-latency connectivity between master peripherals and slave peripherals. The SCR is the decoding, routing, and arbitration logic that enables the connection between multiple masters and slaves that are connected to it.

The SoC 600 also includes application-specific hardware logic, on-chip memory, and additional on-chip peripherals. The peripheral set includes: a configurable video port (Video Port I/F), an Ethernet MAC (EMAC) with a Management Data Input/Output (MDIO) module, a 4-bit transfer/4-bit receive VLYNQ interface, an inter-integrated circuit (I2C) bus interface, multichannel audio serial ports (McASP), general-purpose timers, a watchdog timer, a configurable host port interface (HPI); general-purpose input/output (GPIO) with programmable interrupt/event generation modes, multiplexed with other peripherals, UART interfaces with modem interface signals, pulse width modulators (PWM), an ATA interface, a peripheral component interface (PCI), and external memory interfaces (EMIFA, DDR2). The video port I/F is a receiver and transmitter of video data with two input channels and two output channels that may be configured for standard definition television (SDTV) video data, high definition television (HDTV) video data, and raw video data capture.

As shown in FIG. 6, the SoC 600 includes two high-definition video/imaging coprocessors (HDVICP) and a video data conversion engine (VDCE) to offload many video and image processing tasks from the DSP core. The VDCE supports video frame resizing, anti-aliasing, chrominance signal format conversion, edge padding, color blending, etc. Each HDVICP coprocessor can perform a single 1080p60 H.264 encode or decode or multiple lower resolution or frame rate encodes/decodes. The HDVICP coprocessors are designed to perform computational operations required for video encoding such as motion estimation, motion compensation, mode decision, transformation, and quantization. Further, the distinct circuitry in the HDVICP coprocessors that may be used for specific computation operations is designed to operate in a pipeline fashion under the control of the ARM subsystem and/or the DSP subsystem.

As was previously mentioned, the SoC 600 may be configured to perform video encoding in which rate control that enforces a maximum encoded picture size constraint as describe herein is used. For example, the coding control 340 and rate control 344 of the video encoder of FIG. 3A may be executed on the DSP subsystem or the ARM subsystem and at least some of the computational operations of the block processing 342 may be executed on the HDVICP coprocessors.

Other Embodiments

While the invention has been described with respect to a limited number of embodiments, those skilled in the art, having benefit of this disclosure, will appreciate that other embodiments can be devised which do not depart from the scope of the invention as disclosed herein. For example, a maximum encoded picture size may be determined and enforced by rate control in a video encoder as described herein even if H.241 is not being enforced and/or slice-based encoding is not being used. For example, the maximum encoded picture size and/or the maximum slice size may be user-specified.

While various embodiments have been described herein in reference to the H.264 and H.241 standards, embodiments for other coding standards will be understood by one of ordinary skill in the art. Such video compression standards include, for example, the Moving Picture Experts Group (MPEG) video compression standards, e.g., MPEG-1, MPEG-2, and MPEG-4, the ITU-T video compressions standards, e.g., H.263, H.264, the Society of Motion Picture and Television Engineers (SMPTE) 421 M video CODEC standard (commonly referred to as "VC-1"), the video compression standard defined by the Audio Video Coding Standard Workgroup of China (commonly referred to as "AVS"), ITU-T/ISO High Efficiency Video Coding (HEVC) standard, etc. Accordingly, embodiments of the invention should not be considered limited to the H.264 video coding standard. Further, the term macroblock as used herein refers to block of image data in a picture used for block-based video encoding. One of ordinary skill in the art will understand that the size and dimensions of a macroblock are defined by the particular video coding standard in use, and that different terminology may be used to refer to such a block.

Embodiments of the rate control method described herein may be implemented in hardware, software, firmware, or any combination thereof. If completely or partially implemented in software, the software may be executed in one or more processors, such as a microprocessor, application specific integrated circuit (ASIC), field programmable gate array (FPGA), or digital signal processor (DSP). The software instructions may be initially stored in a computer-readable medium and loaded and executed in the processor. In some cases, the software instructions may also be sold in a computer program product, which includes the computer-readable medium and packaging materials for the computer-readable medium. In some cases, the software instructions may be distributed via removable computer readable media, via a transmission path from computer readable media on another digital system, etc. Examples of computer-readable media include non-writable storage media such as read-only memory devices, writable storage media such as disks, flash memory, memory, or a combination thereof.

Although method steps may be presented and described herein in a sequential fashion, one or more of the steps shown and described may be omitted, repeated, performed concurrently, and/or performed in a different order than the order shown in the figures and/or described herein. Accordingly, embodiments of the invention should not be considered limited to the specific ordering of steps shown in the figures and/or described herein.

It is therefore contemplated that the appended claims will cover any such modifications of the embodiments as fall within the true scope of the invention.

What is claimed is:

1. A method for encoding a picture in a video sequence, the method comprising:
   determining a current encoded size $B_{enc}$ of the picture after coding a plurality of macroblocks in the picture;
   determining that encoding remaining macroblocks in the picture may cause an encoded size of the picture to exceed a maximum encoded picture size $B_{max}$;
   computing a quantization scale $QS_{new}$ responsive to the determining, wherein the quantization scale $QS_{new}$ is computed such that an estimated encoded size of the remaining macroblocks if the remaining macroblocks are quantized with the quantization scale $QS_{new}$ does not exceed a difference between the maximum encoded picture size $B_{max}$ and the current encoded picture size $B_{enc}$, wherein computing a quantization scale $QS_{new}$ comprises computing the quantization scale as $$Qs_{new} = Qs_{avg} * \frac{B_{enc}}{MB_{enc}} * \frac{(MB_{tot} - MB_{enc})}{(B_{max} - B_{enc})}$$

wherein $MB_{enc}$ is a total number of encoded macroblocks in the picture and $MB_{tot}$ is a total number of macroblocks in the picture; and
   quantizing at least one of the remaining macroblocks with the new quantization scale $QS_{new}$.

2. The method of claim 1, wherein determining that encoding remaining macroblocks further comprises determining that an estimated encoded size of the remaining macroblocks if the remaining macroblocks are quantized with an average quantization scale $QS_{avg}$ will exceed the difference between the maximum encoded picture size $B_{max}$ and the current encoded picture size $B_{enc}$, wherein the average quantization scale $QS_{avg}$ is the average quantization scale used to quantize the plurality of macroblocks.

3. The method of claim 2, wherein determining that encoding remaining macroblocks further comprises determining the estimated encoded size of the remaining macroblocks based on an average encoded size of the plurality of macroblocks and a number of the remaining macroblocks.

4. The method of claim 3, wherein encoding remaining macroblocks in the picture is determined to cause the encoded size of the picture to exceed a maximum encoded picture size $B_{max}$ when $$B_{enc}*(MB_{tot}-MB_{enc})>(B_{max}-B_{enc})*MB_{enc}$$

wherein $MB_{enc}$ is a total number of encoded macroblocks in the picture and $MB_{tot}$ is a total number of macroblocks in the picture.

5. The method of claim 1, further comprising:
   determining the maximum encoded picture size $B_{max}$ based on a maximum number of slices that can be encoded in less than a picture rate and a maximum slice size.

6. The method of claim 5, wherein the maximum number of slices is determined based on a number of macroblocks in a picture, a number of processing cycles for a macroblock, a number of slice re-initialization cycles, a number of macroblocks re-encoded due to slice termination, the picture rate, and an empirically determined number of megahertz needed to encode a picture.

7. The method of claim 5, wherein the maximum slice size is a maximum network access layer (NAL) unit size specified by H.241.

8. An apparatus configured to encode a picture in a video sequence, the apparatus comprising:
   means for determining a current encoded size $B_{enc}$ of the picture after coding a plurality of macroblocks in the picture;
   means for determining that encoding remaining macroblocks in the picture may cause an encoded size of the picture to exceed a maximum encoded picture size $B_{max}$;
   means for computing a quantization scale $QS_{new}$ responsive to the determining, wherein the quantization scale $QS_{new}$ is computed such that an estimated encoded size of the remaining macroblocks if the remaining macroblocks are quantized with the quantization scale $QS_{new}$ does not exceed a difference between the maximum encoded picture size $B_{max}$ and the current encoded picture size $B_{enc}$, wherein the means for computing a quantization scale $QS_{new}$ further comprises means for computing the quantization scale as $$Qs_{new} = Qs_{avg} * \frac{B_{enc}}{MB_{enc}} * \frac{(MB_{tot} - MB_{enc})}{(B_{max} - B_{enc})}$$

wherein $MB_{enc}$ is a total number of encoded macroblocks in the picture and $MB_{tot}$ is a total number of macroblocks in the picture; and
   means for quantizing at least one of the remaining macroblocks with the new quantization scale $QS_{new}$.

9. The apparatus of claim 8, wherein the means for determining that encoding remaining macroblocks further comprises means for determining that an estimated encoded size of the remaining macroblocks if the remaining macroblocks are quantized with an average quantization scale $QS_{avg}$ will exceed the difference between the maximum encoded picture size $B_{max}$ and the current encoded picture size $B_{enc}$, wherein the average quantization scale $QS_{avg}$ is the average quantization scale used to quantize the plurality of macroblocks.

10. The apparatus of claim 9, wherein the means for determining that encoding remaining macroblocks further comprises means for determining the estimated encoded size of the remaining macroblocks based on an average encoded size of the plurality of macroblocks and a number of the remaining macroblocks.

11. The apparatus of claim 10, wherein encoding remaining macroblocks in the picture is determined to cause the encoded size of the picture to exceed a maximum encoded picture size $B_{max}$ when $$B_{enc} * (MB_{tot} - MB_{enc}) > (B_{max} - B_{enc}) * MB_{enc}$$

wherein $MB_{enc}$ is a total number of encoded macroblocks in the picture and $MB_{tot}$ is a total number of macroblocks in the picture.

12. The apparatus of claim 8, further comprising:
means for determining the maximum encoded picture size $B_{max}$ based on a maximum number of slices that can be encoded in less than a picture rate and a maximum slice size.

13. The apparatus of claim 12, wherein the maximum number of slices is determined based on a number of macroblocks in a picture, a number of processing cycles for a macroblock, a number of slice re-initialization cycles, a number of macroblocks re-encoded due to slice termination, the picture rate, and an empirically determined number of megahertz needed to encode a picture.

14. The apparatus of claim 12, wherein the maximum slice size is a maximum network access layer (NAL) unit size specified by H.241.

15. A non-transitory computer readable medium storing software instructions that when executed in a digital system cause the digital system to perform a method for encoding for encoding a picture in a video sequence, the method comprising:
determining a current encoded size $B_{enc}$ of the picture after coding a plurality of macroblocks in the picture;
determining that encoding remaining macroblocks in the picture may cause an encoded size of the picture to exceed a maximum encoded picture size $B_{max}$;
computing a quantization scale $QS_{new}$ responsive to the determining, wherein the quantization scale $QS_{new}$ is computed such that an estimated encoded size of the remaining macroblocks if the remaining macroblocks are quantized with the quantization scale $QS_{new}$ does not exceed a difference between the maximum encoded picture size $B_{max}$ and the current encoded picture size $B_{enc}$, wherein computing a quantization scale $QS_{new}$ comprises computing the quantization scale as $$Qs_{new} = Qs_{avg} * \frac{B_{enc}}{MB_{enc}} * \frac{(MB_{tot} - MB_{enc})}{(B_{max} - B_{enc})}$$

wherein $MB_{enc}$ is a total number of encoded macroblocks in the picture and $MB_{tot}$ is a total number of macroblocks in the picture; and
quantizing at least one of the remaining macroblocks with the new quantization scale $QS_{new}$.

16. The computer readable medium of claim 15, wherein computing a quantization scale $QS_{new}$ further comprises computing the quantization scale $QS_{new}$ based on an average quantization scale $QS_{avg}$ used to quantize the plurality of macroblocks and an average encoded size of the plurality of macroblocks; and
determining that encoding remaining macroblocks further comprises determining that an estimated encoded size of the remaining macroblocks if the remaining macroblocks are quantized with the average quantization scale $QS_{avg}$ will exceed the difference between the maximum encoded picture size $B_{max}$ and the current encoded picture size $B_{enc}$.

* * * * *